Figure 1:
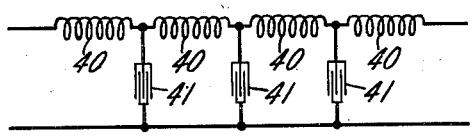

Dec. 16, 1930.                H. C. HARRISON                1,784,871
                      MECHANICAL TRANSMISSION SYSTEM
                      Filed May 22, 1926        3 Sheets-Sheet 1

Inventor:
Henry C. Harrison
by    Jael C. R. Palmer  Atty.

Dec. 16, 1930. H. C. HARRISON 1,784,871
MECHANICAL TRANSMISSION SYSTEM
Filed May 22, 1926   3 Sheets-Sheet 2
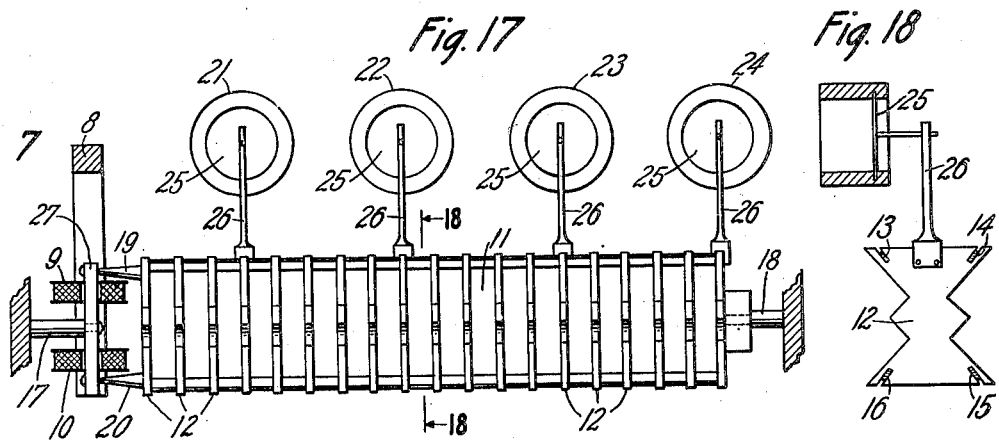
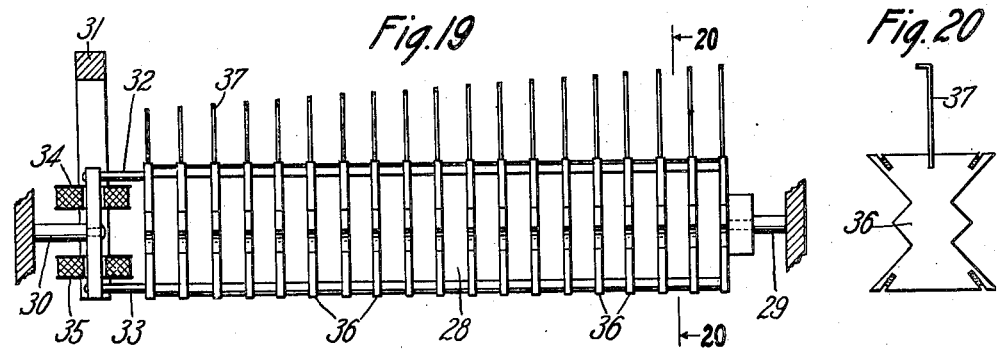
Inventor:
Henry C. Harrison
by Joel C.R. Palmer Atty.

Dec. 16, 1930.   H. C. HARRISON   1,784,871
MECHANICAL TRANSMISSION SYSTEM
Filed May 22, 1926   3 Sheets-Sheet 3

Inventor:
Henry C. Harrison
by Joel R. Paemes   Att'y.

Patented Dec. 16, 1930

1,784,871

UNITED STATES PATENT OFFICE

HENRY C. HARRISON, OF PORT WASHINGTON, NEW YORK, ASSIGNOR TO WESTERN ELECTRIC COMPANY, INCORPORATED, OF NEW YORK, N. Y., A CORPORATION OF NEW YORK

MECHANICAL TRANSMISSION SYSTEM

Application filed May 22, 1926. Serial No. 110,879.

This invention relates to systems for transmitting mechanical vibratory energy and particularly to frequency meters or harmonic analyzers of the type comprising tuned reeds or other selectively responsive elements which are actuated by the wave to be measured, and is a continuation in part of patent application Serial No. 668,801 filed October 16, 1923, which is the continuation in part of application Serial No. 603,005, filed November 24, 1922.

An object of the invention is to provide a mechanical transmission line in which energy is impressed at one point and taken off progressively therealong, and, particularly, a system in which the energy is selectively taken from the line.

A particular object of the invention is to improve the efficiency or accuracy of mechanical lines used as frequency meters.

Considering the application of the invention to the measurement of frequencies, it is not only desirable that a frequency meter be efficient in operation so as to respond to weak currents but also that it be uniformly responsive to currents of all frequencies throughout the range to be measured. This requirement is particularly advantageous when the device is used as an harmonic analyzer, that is, when it is used not only to determine the frequencies present but also their relative magnitudes.

As pointed out in the patent applications referred to above, in the references to the solution of mechanical vibrating systems, the characteristics of wave motion are the same for mechanical and electrical systems so that the fundamental, mechanical and electrical equations for the propagation and dissipation of energy are identical except for the symbols employed. The corresponding elements are:

| Mechanical | Electrical |
|---|---|
| Force | Electromotive force |
| Displacement | Charge |
| Velocity | Current |
| Mass | Inductance |
| Stiffness or elasticity | Reciprocal of capacity |
| Friction | Resistance |

A feature of this invention is a mechanical transmission system, either of the continually loaded type or the lump loaded type, having a uniform transmisison characteristic.

Another feature of this invention consists in distributing selectively responsive elements along the mechanical structure, for example, by associating one tuned reed with each section of the line which may be of the lumped or uniform type. With that arrangement, vibrations may be applied to one end of the line and taken off progressively therealong.

In accordance with another feature of this invention, the frequency meter is composed of a series of sections, each comprising series and shunt mass and elasticity to constitute a mechanical wave filter. For example, series mass and shunt elasticity may be used to give the characteristics of a low-pass wave filter analogous to the electrical low-pass filter disclosed and claimed in U. S. Patent No. 1,227,113, granted to G. A. Campbell, May 22, 1917. Such a filter will uniformly transmit all frequencies below a cut-off frequency $$f_c = \frac{1}{\pi\sqrt{LC}}$$

and will have an impedance substantially equal to the nominal characteristic impedance for all frequencies below the cut-off.

The nominal characteristic impedance, $Z_0$, is equal to $$\sqrt{\frac{L}{C}}.$$

Translating these formulæ into mechanical terms, the cut-off of the mechanical system will be $$f_c = \frac{1}{\pi}\sqrt{\frac{S}{M}}$$

and the nominal characteristic impedance, $$Z_0 = \sqrt{MS},$$

where S and M are respectively the elasticity and mass per section.

Figure 2:
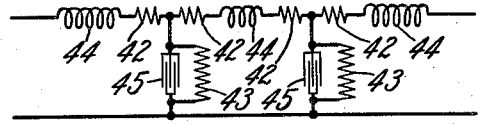
Figure 3:
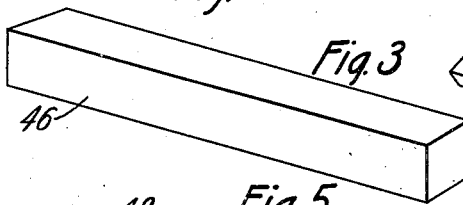
Figure 4:
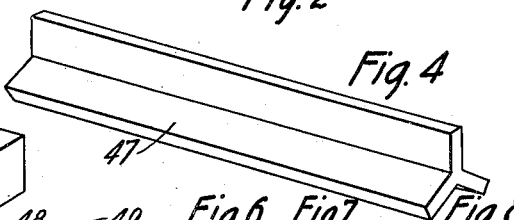
Figure 5:
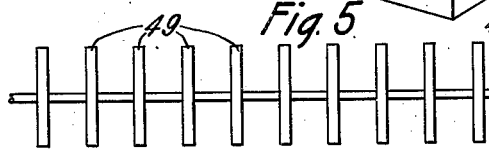
Figure 6:
Figure 7:
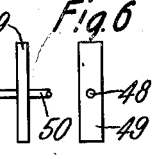
Figure 8:
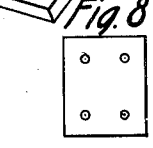
Figure 9:
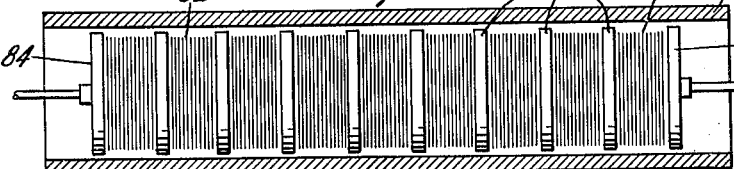
Figure 10:
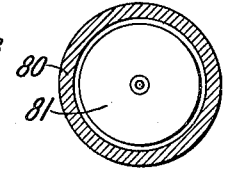
Figure 11:
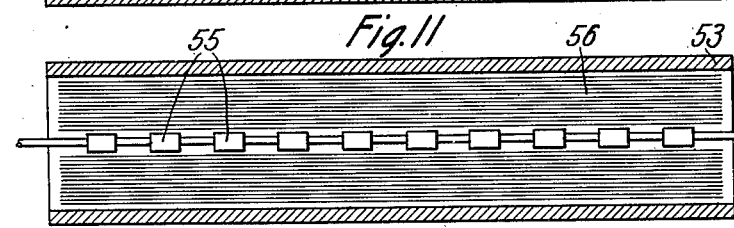
Figure 12:
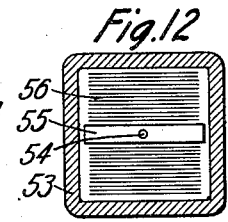
Figure 13:
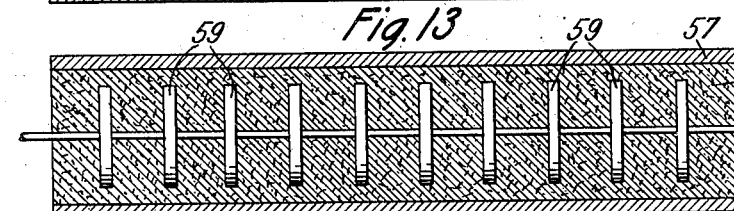
Figure 14:
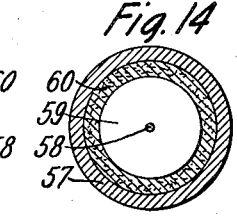
Figure 15:
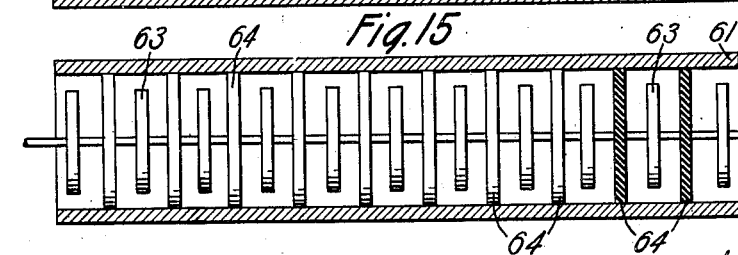
Figure 16:
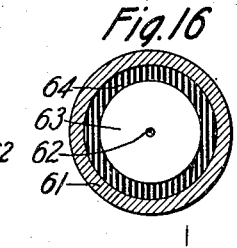
Figure 21:
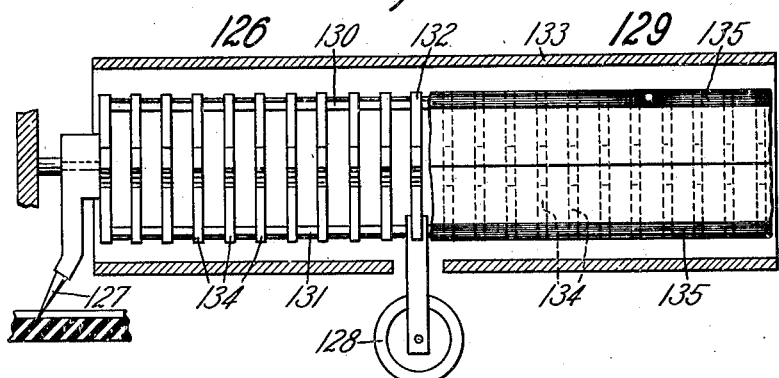
Figure 22:
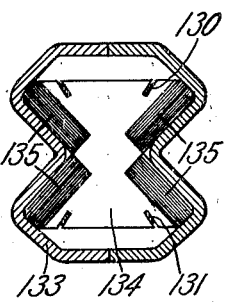
Figure 23:
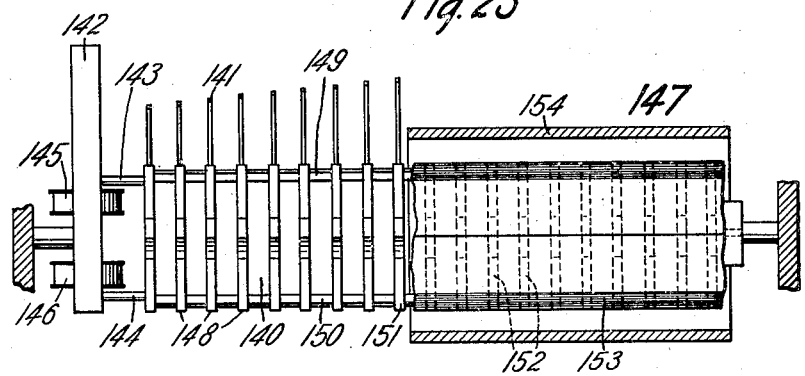
Figure 24:
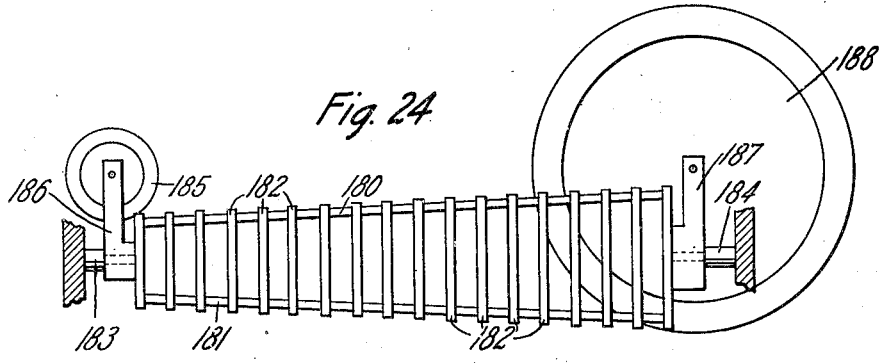

These and other objects and features of the invention can be more readily understood by reference to the following detailed description in connection with the drawing in which:

Fig. 1 represents an electric low-pass filter,

Fig. 2 is an electric low-pass filter of a type comprising resistance in each section for attenuating the transmitted band. Fig. 3 illustrates a metallic bar constructed in accordance with this invention. Fig. 4 is a modification of Fig. 3, of a type which can be subjected only to a twisting motion. Fig. 5 represents a lumped loaded mechanical device of this invention. Fig. 6 is a cross section thereof. Fig. 7 represents a type of this invention in which two rods are employed for connecting the lumped masses. Fig. 8 is a modification of Fig. 6, in which four connecting rods are employed. Fig. 9 is a form of this invention in which the mechanical vibratory energy is impressed on the device by a plunger action. Fig. 10 is a cross section of Fig. 9. Fig. 11 represents a damped mechanical loaded line. Fig. 12 is a cross sectional view of Fig. 11. Fig. 13 represents a mechanical loaded line damped by granular material. Fig. 14 is a cross section of Fig. 13. Fig. 15 represents a mechanical loaded line damped by a plurality of discs of non-metallic material. Fig. 16 is a cross section of Fig. 15. Figs. 17 and 18 show a frequency meter according to this invention, employing resonant chambers. Figs. 19 and 20 show another embodiment of the invention in a frequency meter employing tuned reeds. Figs. 21 and 22 represent a form of the invention employing a terminating impedance. Fig. 23 shows a frequency meter employing tuned reeds and a terminating line similar to that of Fig. 21. Fig. 24 illustrates the form of this invention employed as a mechanical transformer for coupling devices of different impedance.

As stated above an essential feature of this invention is the provision of a mechanical device which can be employed to transmit vibratory energy of a plurality of frequencies from one point to another with the same frequency characteristic as is obtained by an electrical signaling line which, for example, is continuously loaded or lump loaded according to the Pupin system, to give a uniform transmission characteristic over the band of frequencies it is desired to transmit. As further pointed out above, the device may also be constructed in the form of a mechanical filter. Figs. 3 to 16, inclusive, illustrate particular structures of mechanical systems which may be used in this invention, Figs. 1 and 2 showing their electrical analogue.

As is well known in the art, a low-pass electric filter usually comprises a plurality of sections, each consisting of a series inductance and a shunt capacity, as illustrated in Fig. 1 by the connections of the series inductances 40 and the shunt capacities 41. Such a filter, as disclosed in U. S. Patent No. 1,227,133 referred to above, may be arranged by equations therein given to provide for the practically free transmission of a given range of frequencies, while almost entirely suppressing frequencies above that range. In case it would be desired to appreciably attenuate the band of frequencies to be transmitted, resistances such as 42 and 43 of Fig. 2 may be inserted in circuit with the inductances 44 and capacities 45, the values determined by the attenuation desired and the frequency characteristics. Fig. 2, of course, may be also regarded as illustrative of a telephone line loaded in accordance with the Pupin system, for example, in which the inductances represent the loading coils inserted at uniform distances along the line, the series resistances representing the resistance of the line per section, and the capacities, the capacity of the line per section, and the shunt resistances representing a leak across the line.

Fig. 3 represents a simple form of this invention comprising a long metallic bar 46. This bar may, when subjected, for example, to a twisting motion, be employed in the transmission of vibratory energy from one end to the other with any desired impedance characteristic, depending upon the mass per unit length of the bar and the elasticity of the material employed. Such a bar, with the elasticity S and the mass per unit length M, would offer an impedance to the transmission of the twisting motion from one end to another of $$Z_0 = \sqrt{MS}.$$

The result is therefore that the bar of Fig. 3 may be chosen of a material having such elasticity and may have such dimensions that it may be employed to advantage in the mechanical transmission of speech frequency vibrations. As noted from the equation above, the impedance that such a bar offers to a twisting motion is then independent of frequency so that the rod may be inserted in a mechanical vibrating system without danger of distortion taking place. The manner in which a rod may be mounted in the mechanical vibrating system of this invention as a part thereof will be more readily understood by reference to the following figures and the accompanying detailed descriptions.

Fig. 4 is a modification of Fig. 3, in which the device 47 comprises three strips of metallic material integral with each other and separated from each other by an angle of 120°. Such an arrangement allows the device to be subjected to a torsional movement only, and reduces to a considerable degree the danger of having the devices bend due to force exerted at right angles to its axis. With the exception of this protection against bending, the device of Fig. 4 is similar to that of Fig. 3 and may be utilized in the same manner in a mechanical vibrating system.

Figs. 3 and 4 above described correspond in the mechanical field to continuously loaded electric lines since the weight of the bars is uniformly distributed. Fig. 5, however, is the counterpart of a lumped loaded electric line since in Fig. 5 the rod 48, which is subjected to the torsion, is of small diameter and negligible weight, and has distributed along its length a plurality of equal masses 49. The rod 48 therefore represents a long electric line and the masses 49 are the points along the line where loading coils are present. For making the electric line of the desired frequency characteristic, the masses 49 may be of any suitable shape, and may, for example, consist of rectangular bars as shown in Fig. 6, which is a cross section of Fig. 5. The operation of a device such as that shown in Fig. 5 will be better understood from the following explanation. Assume that mechanical vibratory energy is impressed on the end 50 of rod 48 in some suitable manner. For example, the masses 49 adjacent the end 50 may comprise the armature of a solenoid connected to an electric line containing signaling currents. The portion of the rod 48 between the first and the second masses will be twisted due to the action of the solenoid, and the magnetic field in which the armature is situated, and the second mass will receive all the vibratory energy except that dissipated due to the function of the portion of the rod between the first and second weights. The twisted vibratory energy in the second mass will be transferred to the third, and so on until the end of the line is reached, each section of the line undergoing a twisting torsion, thereby providing equivalent shunt paths, such as those containing the capacities 41 of Fig. 1. The character of the frequency transmission between the ends of the rod 48 will, as described above, depend upon the elasticity of the rod 48 and the mass of elements 49.

The mechanical lines shown in Figs. 3, 4 and 5 are particularly suited for use as transmission lines since their dissipation is practically negligible giving substantially no attenuation for the frequencies transmitted thereover. However, in some cases it may be desirable to employ lines having considerable dissipation, particularly when these lines are to be used for terminating other lines or filters. In this case it is desirable that the terminating line have a considerable attenuation in order to practically completely attenuate the mechanical wave in one run to the end of the line and back. This is desirable, since, if a considerable portion of the transmitted energy is reflected back to the original starting point, the reflected energy will be in phase for certain frequencies of the impressed vibrations and out of phase for other frequencies so that the mechanical line will have a variable impedance. Of course, this attenuation can be obtained with a line of small dissipation by making a line of sufficient length. However, it is usually desirable to employ a short line having an appreciable dissipation. The condition that a line of distributed constants have a constant impedance is $$\frac{r}{S} = gM$$

where $r$ is the series dissipation and $g$ the shunt dissipation, corresponding to the leakance in the electrical case.

Dissipation of the motional energy of the mechanical line may be increased in various ways in order to permit a short line to be employed without danger of a non-uniform frequency transmission characteristic due to the reflection above mentioned. Fig. 11 illustrates a rectangular casing 53 enclosing a spring rod 54, which has distributed uniformly along its length a plurality of equal mass elements 55. These masses, as shown in Fig. 12, comprise rectangular bars parallel to each other. On each side of the bars are a large number of sheets 56 of damping material, such as aluminum foil or paper. When the spring rod 54 is subjected to a twisting motion, the resulting vibration of the weights 55 will be appreciably retarded by the foil sheets and the air enclosed between them, thereby dissipating, as heat, to a considerable degree the mechanical energy passing along the rod 54. It has been found that aluminum foil is quite satisfactory for this purpose and need be only fairly loosely packed between the casing 53 and the rectangular bars 55 in order to provide such a dissipation of the energy for a line of thirty to forty sections that practically all of the energy impressed on one end of the bar 54 is dissipated before it has gone the full length of the rod and returned again. The dissipation is due principally to the pressure on the sheets causing the air between the sheets to be forced out for each vibration. The casing 53 should therefore be built so as to provide for the ready escape of the air between the sheets.

Figs. 13 and 14 illustrate another way in which the motional energy may be dissipated when, for example, the device is employed as a mechanical resistance. In this particular modification, the casing 57 contains suitably supported along its axis a spring rod 58 which is lumped loaded by a plurality of discs 59. The remainder of the casing is substantially filled with a coarse granular material, such as ground cork, aluminum powder or sand, which will oppose and dissipate the vibratory energy of the lumped masses 59.

Figs. 15 and 16 represent a third way in which the energy may be dissipated. A casing 61 is disclosed containing in addition to a lumped mechanical line comprising a spring rod 62, and lumped weights 63, a plurality of discs 64 of spongy material, such as rubber. These discs of rubber 64 may, if desired, engage both the spring rod 62 and the inner walls of the casing 61.

The mechanical lines of this invention are not limited to those which may be employed for transmitting torsional energy. In Fig. 9, a mechanical resistance is disclosed in which the motional energy is impressed upon the device by a plunger action and transmitted as longitudinal vibrations. A casing 80, as disclosed, contains a plurality of spaced weights 81, separated from each other by a plurality of thin sheets 82 of damping material such as aluminum foil or paper. Plungers 83 and 84 serve to close each end of the casing 80 and the movement of the plunger 83, for example, will be transmitted through the air cushioning between the foil sheets and the spaced weights 81 to the plunger 84 at the opposite end. The spaced weights constitute the mass of the mechanical line and the air between the thin sheets of foil presents an elastic reaction to the motion, so that the embodiment of Fig. 9 is the mechanical equivalent of the electric systems of Fig. 1 or 2, depending on the presence or absence of dissipation. The weights 81 represent the inductances and the elasticity of the air films between the foil sheets which lie between the weights corresponding to the shunt capacities. The system of Fig. 9 may be employed in a mechanical system with any desired frequency transmission characteristic and may be so constructed with respect to the distributed masses and elasticities as to have a substantially constant impedance for a wide range of frequencies. The chief function of the foil sheets is to provide thin layers of air to give the required elasticity to the system, that is, the elasticity is due to the air between the sheets and not due solely to the sheets. If the sheets fit into the casing tightly so as to substantially prevent the escape of the air there is very little dissipation of energy and the mechanical line is the equivalent of the electric line of Fig. 1. If the sheets fit loosely in the casing, the mechanical line would be equivalent of Fig. 2 since both elasticity and dissipation would be present.

Figs. 17 and 18 show a frequency meter comprising an electromagnetic element 7 composed of a permanent magnet 8 and an armature 27 which is surrounded by two coils upon which electrical currents to be analyzed may be impressed. Attached to the armature is the mechanical line or filter 11. This line is of the type comprising a plurality of lumped masses 12 connected by four strips of elastic material 13, 14, 15 and 16. These strips as shown in Fig. 18 are placed at the four corners of a rectangle and are so radially and angularly spaced that their projections pass through the center of the masses 12. The mechanical line 11 is pivotally supported at the ends by the pivot members 17 and 18 to permit the line to be freely twisted in accordance with the mechanical vibratory energy of the armature of the electromagnetic element 7, to which the line is attached by means of the two members 19 and 20.

At desired points along the line, sound resonating chambers 21, 22, 23 and 24 are provided, each having a diaphragm 25 coupled to a mass element 12 by a connecting member 26. The twisting motion impressed upon the mechanical line by the vibration of the armature of the electromagnetic element 7 will cause the diaphragms 25 to undergo corresponding vibrations and if each of the sound chambers 21, 22, 23 and 24 is made resonant to a particular frequency, it follows that the intensity of the sound in each of the chambers will be a measure of the intensity of those frequencies of the electrical currents impressed upon the receiver coils 9 and 10. It is obvious, of course, that any desired number of chambers may be coupled to the mechanical line, each resonant for a particular frequency. The showing of the resonating chambers in Figs. 17 and 18 is not strictly accurate with respect to dimensions since in general their dimensions will be considerably greater than the corresponding dimensions of the mechanical transmission line. The line, of course, must be designed so that its cut-off frequency is above the resonant frequency of the chamber having the highest resonant frequency.

It is of course obvious that the line 11 disclosed in Fig. 17 may be replaced by other forms of lines, such, for example, as those shown in Figs. 3 to 16 inclusive, to give the frequency meter a uniform response characteristic.

Figs. 19 and 20 show a harmonic analyzer employing a mechanical line 28 similar to the line 11 used in the analyzer of Fig. 1. This line is similarly pivoted at its ends by pivot members 29 and 30 and has one end connected to the armature of an electromagnetic receiver 31 by means of members 32 and 33. The electromagnetic element 31 is provided with coils 34 and 35 upon which may be impressed electrical currents which it is desired to measure. Each of the mass elements 36 of the line has connected thereto a reed 37 designed to resonate at a particular frequency. The vibrations of the reeds 37 will therefore be a measure of the intensity of the respective frequencies present in the complex wave impressed upon the coils 34 and 35. If desired, a scale can be provided above the reeds so that the amplitude of their vibration may be measured.

Since due to dissipation in the line, the frequencies in the neighborhood of the cut-off may be somewhat attenuated, it may be desirable to mount the reeds which are resonant at the higher frequencies on the masses adjacent the electromagnetic element 31.

Since the reeds are not only responsive to the frequency to which they are tuned, but also to harmonics of that frequency, it is sometimes desirable to prevent the reeds from responding to their harmonics so as to get an accurate measurement of the relative amplitudes of the frequencies present. This can be readily done with the device of this invention by using a series of reeds in which the resonant frequency of the reed of highest resonance is below the first harmonic of the reed of lowest resonant frequency and designing the line to have a cut-off below the frequency of that harmonic. Thus, the only frequencies which will be transmitted from the electromagnetic element to the reeds will be the fundamental frequency of the reeds. If it is desired to make the device responsive to a larger range of frequencies the line may be composed of sections designed to have the same impedance but having progressively increasing cut-offs so that between the driving mechanism and any reed there is a line or filter section which suppresses the harmonics of that reed.

In either of the embodiments above described it may be desirable in order to prevent reflection to terminate the end of the line remote from the driving mechanism in a mechanical resistance equal to the characteristic impedance of the line. The lines shown in Figs. 11, 13 and 15 are particularly suitable for this purpose.

Figs. 21 and 22 show a mechanical line of the type used in the meters of Figs. 17 and 19 terminated in a mechanical resistance. These figures show a mechanical line 126 for coupling phonograph needle 127 to carbon button 128, a mechanical terminated resistance 129 being added to the structure to prevent reflection at the point to which the carbon button 128 is connected. The spring strips 130 and 131, and two others, not shown but placed similarly to those of Fig. 17, are continued beyond the lumped mass 132, a desired number of sections. Beyond the mass 132 a plurality of thin sheets 135 of material such as metal foil are packed between the lumped masses 134 and the casing 133. These sheets of damping material are provided for dissipating the transmitted energy for the portions of the spring strips extending beyond the point where the carbon button is coupled to the mechanical line, and it is obvious that the amount of packing employed in a particular case will depend upon how rapidly it is desired to dissipate this energy. In constructing such a mechanical line, impedance irregularities should be avoided by having any attachments to a lumped mass included in calculating the weight for the coupling mass so that the total mass including the attachments equals the desired mass per section of the mechanical line. The mass 132 of Fig. 21 should therefore be less than the mass per unit section by an amount dependent upon the mass of the attachment.

Fig. 23 shows a frequency meter similar to that shown in Figs. 19 and 20 but terminated in a mechanical resistance similar to that used for terminating the line of Figs. 21 and 22. A similar terminating arrangement could of course be used in connection with the frequency meter of Fig. 17 which employs resonant chambers. This figure shows a mechanical line 140 on which are mounted a plurality of tuned reeds 141. One end of the line is connected to the armature of an electromagnetic receiver 142 by means of members 143 and 144. The receiver is provided with coils 145 and 146 upon which may be impressed electrical currents which it is desired to measure. The other end of the line is connected to a mechanical resistance 147 to terminate the line in such a manner as to prevent reflection. The reeds 141 are mounted on the mass elements 148 and are designed to resonate at particular frequencies in a similar manner to the reeds of the meter of Fig. 19. The mechanical resistance is of the same type as that shown in Fig. 21, being formed by extending the spring strips 149 and 150 and the two others, not shown, beyond the end mass 151 of the line 140. A plurality of mass elements 152 are distributed along the extension of the spring strips and a plurality of thin sheets 153 of material such as metal foil are packed between these masses 152 and the casing 154. These sheets of damping material serve to dissipate the energy transmitted to the terminating line. Since the extension of the line is similarly constructed to the transmitting line 140, it has the same mechanical impedance so that there is no reflection at the point 151, the waves transmitted beyond this point being dissipated in the resistance line 147 during one run to the end and back so that no waves are reflected back from the open end upon the line 140.

In some cases it may be desirable to employ a line for operating between devices having different mechanical impedances. For this purpose it is desirable to employ a mechanical tapered member in order to obtain efficient transmission, since maximum transmission efficiency is obtained when one mechanical impedance works into an equal mechanical impedance.

In Fig. 24 a mechanical line is disclosed having spring strips 180, 181, coupled by a plurality of tapered masses 182. The amount the mechanical line is tapered will, of course, depend upon the ratio of impedances to be coupled thereby, the smaller end of the mechanical line being coupled to the smaller impedance and the larger end being coupled to the larger impedance. The tapered line is shown pivotally supported at the two ends by pivot members 183, 184, whereby the vibrational energy may be freely transmitted by the line. The small end of the mechanical line, by member 186, is coupled to a carbon button 185 for varying the pressure on the carbon material contained therein. The larger end of the line, by member 187, is coupled to a diaphragm 188 of a transmitter so that the disclosed system provides an arrangement for transferring the mechanical vibrations of the transmitter diaphragm 188 of a carbon button 185 whereby the mechanical vibrations may be efficiently translated into electric currents. In this case motion of the button is made large compared with the motion of the diaphragm thereby giving high button volume.

In designing such a mechanical network the following impedance relation will be found satisfactory, $$\frac{Z_0}{Z_1} = \frac{Z_1}{Z_2} = \frac{Z_2}{Z_3} \cdots = \frac{Z_n-1}{Z_n} = \text{a constant},$$

where $Z_0$ is the mechanical impedance of the diaphragm and the attachments thereto, $Z_1$ the impedance of the first section of the mechanical line, $Z_2$ the impedance of the second section, $Z_n-1$ the impedance of the last section, and $Z_n$ the impedance of the carbon button. This arrangement will therefore function as a mechanical transformer for coupling the two unequal impedances.

The term "measure" is used in the above specification and in the claims in a broad sense to cover indicating either the frequency or frequencies impressed or the magnitude thereof.

What is claimed is:

1. In combination, a mechanical line comprising a plurality of mass elements and a plurality of elastic elements coupling said masses serially, said elements having uniform masses and elasticities respectively whereby said line has a substantially constant impedance for a wide range of frequencies to be transmitted, means associated with said line at a point along its length for impressing vibrations thereon, and a plurality of means associated with said line at other points for receiving wave energy therefrom.

2. A combination according to claim 1, in which the plurality of energy receiving means are selectively responsive to wave energy.

3. In combination, a mechanical line comprising a plurality of mass elements and a plurality of elastic elements coupling said masses serially, said elements having uniform masses and elasticities respectively whereby said line has a substantially constant impedance for a wide range of frequencies to be transmitted, means associated with said line at one end thereof for impressing vibrations thereon, a plurality of means associated with said line at other points for receiving wave energy therefrom and means connected to the other end of said line for terminating it, said means having an impedance substantially equal to the impedance of said line for the range of frequencies to be transmitted.

4. A device for measuring frequencies within a given range comprising a plurality of elements, each selectively responsive to a definite frequency within said range, means responsive to wave motion for actuating said elements, and means for coupling said elements to said responsive means comprising a plurality of uniform mass elements and uniform elastic elements coupling said mass elements serially, the ratio of the elasticity of said elastic coupling elements to the values of said masses being large enough to permit the transmission through the coupling means of all frequencies in the given range.

5. A device according to claim 4, in which the coupling member comprises an elastic bar and masses distributed therealong, and the selectively responsive means comprising reeds attached to the mass elements, the reed tuned to the highest frequency being attached to a mass closest to the driving mass.

6. A device according to claim 4, in which the selectively responsive means comprises resonant chambers having diaphragms attached to the mass elements.

In witness whereof, I hereunto subscribe my name this 19th day of May A. D., 1926.

HENRY C. HARRISON.